XR 3,564,460
SEARCH ROOM
CROSS REFERENCE

E. K. SITTIG 3,564,460

FOLDED PATH PERPENDICULAR DIFFRACTION DELAY LINE

Filed Dec. 18, 1967

INVENTOR
E. K. SITTIG
BY Roy M. Porter
ATTORNEY

3564460
OR IN 333/30R

United States Patent Office 3,564,460

Patented Feb. 16, 1971

3,564,460
FOLDED PATH PERPENDICULAR DIFFRACTION DELAY LINE

Erhard K. Sittig, Berkeley Heights, N.J., assignor to Bell Telephone Laboratories, Incorporated, Murray Hill, N.J., a corporation of New York Filed Dec. 18, 1967, Ser. No. 691,453
Int. Cl. H03h 9/30
U.S. Cl. 333—30 7 Claims

ABSTRACT OF THE DISCLOSURE

An intermediary graded grating, which may be transmitting, is positioned in the beam path between the input and output graded gratings usually found in a perpendicular diffraction delay line. The intermediary grating intercepts the beams and rediffracts desired orders of them to the output grating without loss of the inherent averaging properties of the perpendicular diffraction delay line.

BACKGROUND OF THE INVENTION

This invention relates to frequency selective systems for elastic wave energy and more particularly to delay line structures having a frequency dependent delay characteristic and employing the principles of diffraction gratings.

Elastic wave dispersive delay lines; i.e., those having a delay that varies according to some function of frequency, are well known and their usefulness in numerous applications is recognized. In dispersive delay lines using diffraction gratings, the grating is illuminated by a nondispersive elastic wave. Dispersion is effected since the effective path length between a transmitting and a receiving transducer, which determines the delay time, is made to vary with varying frequency. Elastic waves emitted by individual elements of an array add up in phase and produce maximum intensity in certain directions, which depend in a well known manner on the wave length and the spacing of the elements. Various embodiments of this idea are disclosed in U.S. Pat. 3,300,739 issued on Jan. 24, 1967 to W. S. Mortley. Each embodiment provides a single delay path length associated with each value of frequency within its range of operation. Devices of that type therefore need to be manufactured with extreme precision with respect to the positions of the array elements and homogenity of the propagating material if they are to meet the stringent requirements imposed by their application.

Better performance can be obtained, if several delay paths of equal length can be provided for each value of frequency, so that small variations of the individual paths can be averaged out in their influence on the output signal of the delay line. One such device known as the perpendicular diffraction delay line is fully disclosed in "The Perpendicular Diffraction Delay Line: A New Kind of Ultrasonic Dispersive Device," by R. S. Duncan and M. R. Parker, Proceedings of the IEEE, April 1965, page 413. This configuration provides linear variation of delay time with frequency and is especially well suited for use in pulse compression radar systems.

The essential features of a perpendicular diffraction delay line are the input and output arrays which are positioned perpendicularly to each other on or in a block of propagating material. Each array is a graded series of discontinuities to elastic wave energy; i.e., a series of elements or lines, which emit elastic wave energy, separated by spaces whose emission characteristics differ either in amplitude or phase from those of the lines. The spacing between elements is nonuniform in a prescribed manner. The input and output arrays are associated respectively with a means for launching and receiving elastic wave energy, such as a series of individually spaced transducers or a single continuous transducer. Conventionally, diffraction gratings are formed on the face of a single piezoelectric transducer of appropriate resonant frequency which is bonded to the propagating material.

The perpendicular diffraction delay line provides a set of nonparallel paths for each frequency within its bandwidth. The length of a path from input to output differs for beams in different frequency sets and all paths in a single frequency set have an identical path length. Therefore, a distinct delay defined by the path length is determined for each frequency. The received energy at a given frequency is a combination of the energy content of a plurality of cooperating beams in that frequency set. Each cooperating beam contributes energy of roughly equal amplitude to the output and the redundancy of paths for each operating frequency contributes to a reduction of errors due to inaccuracies in grating placement, inhomogeneities in the propagating material and the like.

For purposes of comparison with the present invention it should be noted that in the perpendicular delay line the plurality of cooperating paths at any given frequency includes a number of exactly inphase paths approximately equal to the number of elements in the smaller of the two arrays. The number of elements in either array is fixed by the design and cannot be increased to obtain better averaging without interfering with the specifications of the delay line. For a given delay variation over a given frequency range, the design procedure, described in detail in "Theory and Performance of Perpendicular Diffraction Delay Lines," by G. A. Coquin and R. Tsu, Proceedings of the IEEE, June 1965, page 581, also fixes the dimensions of the arrays and the propagating material. Large blocks of material are required for significant delay and long arrays are required for broad bandwidth. This puts considerable strain upon methods of fabrication.

A device designed to operate within the 60 to 90 mHz. frequency range comprises, for example, a block of material approximately 335 millimeters by 164 millimeters with an output transducer approximately 208 millimeters long and an input transducer approximately 38 millimeters long. The necessity of obtaining large blocks and long transducers in singel pieces makes such a delay line extremely expensive. In addition, the resulting high transducer capacitance necessitates operating at inconveniently low impedance levels.

SUMMARY OF THE INVENTION

In accordance with the present invention, a diffraction delay line is obtained with the redundancy properties of a perpendicular diffraction delay line. The size of the delay line is reduced in comparison to a conventional perpendicular diffraction delay line of equal specifications by folding the beam paths thus increasing the lengths of beam paths relative to the dimensions of the block of propagating material. Large transducers are made unnecessary by using an intermediary graded diffraction grating which is positioned to intercept and rediffract diffracted beams emitted by a comparatively small transmitting array. The rediffracted beam is then intercepted by a receiving array similar to the transmitting one. Thus the need to provide a transducer of the dimensions of the large array in a perpendicular line is entirely avoided.

Rediffraction is not equivalent to redirection. A reflecting or refracting surface which redirects incident beams would also bend the beams and hence increase the relative length of the beam paths, but each incident beam would produce a single redirected beam. In contrast, each element of the intermediary diffraction grating constitutes an independent source of radiation. Hence there exists a multiplicity of paths between an element of the transmitting array A to an element of the intermediary grating B, then to an element of the receiving array C for which the sum of the distances from A to B to C are equal. This feature is utilized to provide at least as many cooperating paths for averaging as can be obtained in an unfolded perpendicular line having identical specifications though there are significantly fewer elements in the smaller array of the folded line than in the smaller array of the unfolded line.

In accordance with the present invention a perpendicular diffraction delay line is folded by using an intermediary grating to rediffract diffracted beams incident upon it. The grating may be formed by bonding together the edges of two blocks of propagating material leaving sections unbonded. The bonded sections constitute the lines of the grating and the unbonded sections are the spaces. The grating is arranged to that incident beams are propagated in one block and their rediffracted counterparts are directed through the other block of material. Since the beam energy is transmitted through the grating the device operates in the transmitting mode, and the angle of incidence and the angle of rediffraction may be equal without producing coincident beam paths for the incident and rediffracted beams.

If the intermediary grating were reflective, equal angles of incidence and diffraction would give rise to coincident beam paths and consequently input and output transducers would be coincident also. Thus, a workable reflecting intermediary grating must create unequal angles of incidence and diffraction to prevent coincident incident and rediffracted beam paths. A delay line with such properties is disclosed in copending patent application Ser. No. 691,304, M. R. Parker, Jr., filed on even date herewith.

It is an object of the present invention to provide a diffraction delay line which is simpler and less expensive than the perpendicular diffraction delay line. A folded delay line meets this objective by utilizing an intermediary grating which intercepts the diffracted beams propagating from the input grating and selectively rediffracts them to the output grating. In comparison to an unfolded perpendicular diffraction delay line, a folded delay line which provides the same dispersion and bandwidth has smaller transducer-gratings mounted on a smaller block of propagating material. The folded line uses a relatively inexpensive intermediary mechanical grating with small input and output arrays and hence inexpensive transducers in place of the conventional large arrays requiring costly transducers. Yet the folded line provides at least as many cooperating paths as the equivalent unfolded delay line.

BRIEF DESCRIPTION OF THE DRAWINGS

The novel features of the invention will become apparent from the following detailed description taken in conjunction with the accompanying drawing in which.

DETAILED DESCRIPTION

Figure 1:
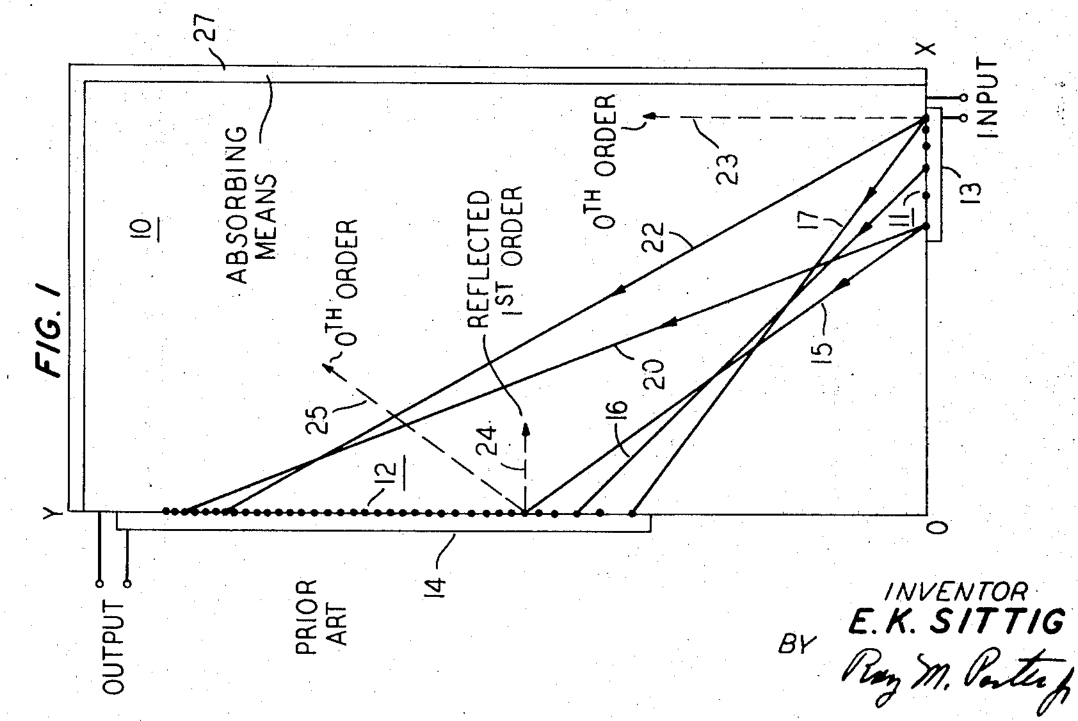
FIG. 1 is a schematic representation of a conventional unfolded perpendicular diffraction delay line.

In order to understand the folded perpendicular diffraction delay line it is necessary to first understand the conventional unfolded perpendicular diffraction delay line. The unfolded line, illustrated by way of example in FIG. 1, consists of two transducers 13 and 14 and two respectively associated graded gratings 11 and 12, distributed along the X and Y axes of propagating material 10. Though the line is reciprocal, assume for example that a multifrequency input signal is introduced at transducer 13. Grating 11 causes diffraction of the input signal in much the same way as an optical signal is diffracted by an optical diffraction grating.

Each frequency component of the input signal is propagated toward output grating 12 as a distinct set of beams, a low frequency first order set being indicated for example by lines 15 through 17 and a high frequency first order set by lines 20 through 22. Beams in a set are propagated along nonparallel paths such that the length of all paths in a set are identical. Different frequency components travel paths in different sets which are, of course, of different lengths, as illustrated for example by comparing lines 15 and 20. Since path length determines delay time, diffraction converted into dispersion in space results in dispersion in time. Output grating 12 is arranged to intercept diffracted beams and output transducer 14 combines all desired frequency components. In the collapse mode the operation is essentially the reverse, i.e., a signal having time ordered frequency components is merged into one pulse.

Dashed lines 23 through 25 represent examples of beam paths of diffraction orders not utilized which must be absorbed by absorbing means 27 to prevent spurious signals. Herein, for purposes of explanation orders of diffraction are labeled relative to the diffracting grating and the specular diffraction is designated the zeroth order.

The design equations for a conventional perpendicular diffraction delay line are well known. The derivation of the defining laws, referred to as grating laws, is beyond the scope of this disclosure, but these laws are derived and fully described in the above-mentioned article by G. A. Coquin and R. Tsu. In accordance with the grating laws the spacing between the lines of each of the two perpendicular gratings is defined by $C_i=\vec{s}_i d_i$, where $C_i$ is the grating constant for the $i$th grating, $\vec{s}_i$ is a distance from the common origin to the midpoint between any two adjacent elements of the $i$th grating, and and $d_i$ is the distance between those two adjacent elements. The grating constant is defined for a desired order of diffraction $p$, bandwidth $\Delta f$ and delay time dispersion T defined by $T=t\Delta f/f$, where $t$ is the dalay time at a frequency $f$ within $\Delta f$.

A set of beam paths corresponds to each discrete frequency within the bandwidth $\Delta f$. Since every path in a set has an identical length, the wave fronts of each beam in a set arrive simultaneously at output grating 12. This redundancy of beams carrying a single frequency, contributes to improve averaging of errors associated with any one frequency. For the wedge grating delay line disclosed in "Dispersion by Plane Wave Excitation of Piezoelectric Transducer Arrays" by D. E. Miller and M. R. Parker, Proceedings of the IEEE, June 1966, page 891, the number of exactly inphase paths contributing to the output at a distinct frequency is one. The number of exactly inphase paths for a perpendicular diffraction delay line is approximately N, where N is the number of elements in the smaller of the gratings, for a frequency within the operating bandwidth of the device.

Figure 2:
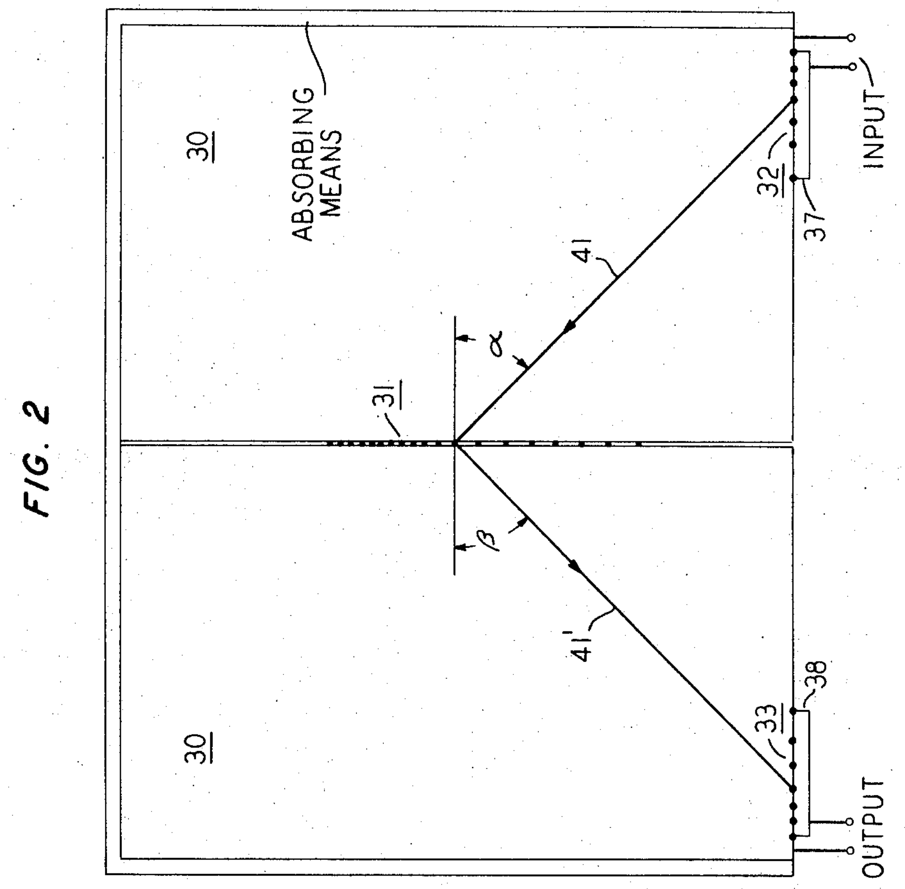
FIG. 2 is a schematic representation of a single fold perpendicular diffraction delay line in accordance with the present invention.

In accordance with the present invention, FIG. 2 shows, by way of example, a folded path perpendicular diffraction delay line in which intermediary grating 31 has been positioned in the beam paths between gratings 32 and 33. The well known grating laws define the location of each element in each grating. As in the unfolded delay line illustrated in FIG. 1 graded gratings are shown as the diffracting arrays. It is to be clearly understood that any type of array which provides a graded series of discontinuities to elastic wave energy would be suitable so long as the elements of the array cause diffraction of the incident beams and produce frequency dependent directional propagation of relatively narrow beams of elastic wave energy.

Intermediary grating 31 is a mechanical transmitting diffraction grating which provides good transmission in its grating lines and relatively poor transmission in its spaces. It is remote from any transducer and effectve to rediffract diffracted beams. Gratings 32 and 33 are associated respectively with transducers 37 and 38. Though the line is reciprocal, for purposes of discussion, transducer 37 with associated grating 32 will be arbitrarily referred to as the input and transducer-grating 38–33 will therefore be referred to as the output. It should be clearly understood that suitable arrays of any type associated with suitable launching and receiving means could be substituted for transducer-gratings 37–32 and 38–33.

The delay line is composed of a block 30 of appropriate propagating material, such as fused silica for operation in the 1 mHz. to 1 gHz. frequency range, which is equipped with transducer-grating combinations 37–32 and 38–33 and intermediary graded grating 31. Energy introduced at transducer-grating 37–32 is diffracted and propagated along multiple paths such as paths 40 and 41, rediffracted by intermediary grating 31, and propagated along paths such as paths 40′ and 41′ toward transducer-grating 38–33. Paths 40, 41, 40′ and 41′ are representative of a set of paths travelled by beams of a single frequency, and the plurality of multifrequency beams received are combined to form an output signal.

In the embodiment shown grating 31 operates in the transmitting mode, and it is therefore placed physically within the propagating material. Thus, an incident diffracted beam will be propagated along a path such as 41 on one side of grating 31 and its rediffracted counterpart will be propagated along a path such as 41′ on the opposite side of grating 31. Diffraction angle B and incident angle $\alpha$ measured between the normal to the grating and the appropriate beam path are equal.

One half of the total delay variation of the delay line occurs from transducer-grating 37–32 to grating 31 and another half from grating 31 to transducer-grating 38–33. The path lengths are therefore identical. Transducer-gratings 37–32 and 38–33 are equal in size and are each one half the size of the smaller array in an unfolded perpendicular diffraction delay line designated for an equivalent frequency range and delay time variation. Gratings 32 and 33 each contain half the number of elements in the smaller array of the equivalent unfolded line. Mechanical grating 31 contains the same number of elements as the larger array of the equivalent unfolded line, but the lines of grating 31 are twice as dense and therefore grating 31 is one half the length of the unfolded line's larger array.

In both the conventional unfolded and the folded perpendicular diffraction delay lines the bonding layers affixing transducers to the propagating material must be either accoustically matched or be very thin. Epoxy bonds must typically not exceed 0.5 micron in the 100 mHz. frequency range in order not to distort the response characteristics of the transducers unduly.

Since transmitting intermediary grating 31 is the bonding layer holding together two blocks of delay medium, it must fulfill the additional requirement that the elastic wave transmission be large in the grating lines but small in the spaces between the lines. Otherwise most of the impinging beams would be either reflected or pass through undiffracted, thus producing an unacceptably large insertion loss. Any fluid bond is incapable of meeting this requirement, but a solid bond, made by cold welding indium plated surfaces together is adequate.

In this type of bond, a metal grating of the required dimensions is first produced on one of the two surfaces to be bonded together. Both surfaces are then plated with indium and brought into contact under high pressure. Since the indium film is raised by the metal grating lines above the level in the spaces, bonding by cold welding takes place only at the locations of the grating lines producing a bond of the required properties.

Folding by means of an intermediary diffraction grating utilizes a large but inexpensive intermediary grating which rediffracts diffracted beams. Thus, the large and costly input and output gratings and their associated transducers of the conventional perpendicular diffraction delay line can be replaced by much smaller units. These reductions in size and number of elements result in cost savings and higher impedance levels because of the smaller transducers required, but the folded structure provides at least as high a level of redundancy of beam paths as does the equivalent unfolded diffraction delay line.

Although the invention has been described in terms of a signle fold, a multiply folded perpendicular diffraction delay line may also be designed according to the principles discussed above.

For all embodiments of the invention, the construction and mounting of the gratings and transducers according to the above-described design may be accomplished by any of the well known methods, such as photoetching the gratings and epoxy bonding the transducers to the propagating material, which are conventionally employed in the fabrication of unfolded diffraction delay lines.

In order to suppress spurious signals an absorbing means can be provided, such as by beveling the unused edges and placing absorbing material on the upper and lower surfaces of the block of propagating material so that the absorbing material dampens the undesired signals reflected by the beveling.

In all cases it is to be understood that the above described arrangement are merely illustrative of a small number of the many possible applications of the principles of the invention. Numerous and varied other arrangements in accordance with these principles may readily be devised by those skilled in the art without departing from the spirit and scope of the invention.

I claim:

1. A perpendicular diffraction delay line of the type having a body of propagating material, two electric signal to elastic wave transducers bonded to said material, a graded diffraction grating affixed to each of said transducers, said diffraction gratings being proportioned to direct beams along beam paths according to their frequency content such that a plurality of beams of like frequency travel equal distances from input to output along nonparallel paths in a single plane and beams of different frequency travel paths of different distances from input to output in the same single plane, characterized in that an intermediary mechanical graded grating is a transmitting grating and is positioned within said propagating material in a plane orthogonal to the same single plane to intercept each of said paths and is proportioned to rediffract each beam from said input incident upon said intermediary grating through said intermediary grating to said output.

2. A diffraction delay line of the type having a body of propagating material and a plurality of graded arrays arranged to produce a plurality of sets of diffracted beams each of said plurality of sets consisting of a plurality of beams of the same frequency, said same frequency being different from the frequency of beams in all other of said sets, and disposed to propagate in a single propagating plane within said body the diffracted beams of all of said sets such that all beams of any one of said sets travel nonparallel paths having the same path length, said same path length being different from the length of any path traveled by a diffracted beam of any other of said sets, characterized in that means for launching and receiving elastic wave energy are associated respectively with a first and second array of said plurality of arrays and a third array of said pluality of arrays is arranged to intecept said each diffracted beam propagating from said first array in said single propagating plane and to rediffract in said single propagating plane said intercepted beams toward said second array.

3. A diffraction delay line of claim 2 wherein each of the elements of said third array intercepting diffracted beams from said first array lies in a plane which is positioned normal to the plane containing the elements of said first array.

4. A diffraction delay line of claim 2 wherein said third array is remote from any means for launching or receiving elastic wave energy.

5. A diffraction delay line of the type having a body of propagating material and a plurality of graded arrays for producing a plurality of sets of diffracted beams, each of said plurality of sets consisting of a plurality of beams of the same frequency, said same frequency being different from the frequency of beams in all other of said sets, and for propagating in a single propagating plane within said body the diffracted beams of all of said sets such that all beams of any one of said sets travel nonparallel paths having the same path length, said same path length being different from the length of any path traveled by a diffracted beam of any other of said sets, characterized in that one of said plurality of arrays is positioned within said propagating material and transmits beams incident upon it from the propagating material on one side of said one array in said single plane through itself to the material on the other side of said one array in said single plane.

6. A diffraction delay line of claim 2 wherein each element of said third array lies in a plane perpendicular to a plane in which the elements of both said first and second arrays lie.

7. A diffraction delay line as in claim 5 wherein said one graded array is so positioned as to intercept said incident beams and rediffract them at diffraction angles equal to the angle of incidence of said beams.

References Cited

UNITED STATES PATENTS

| | | | |
|---|---|---|---|
| 3,300,739 | 1/1967 | Mortley | 333—30 |
| 3,378,793 | 4/1968 | Mortley | 333—30 |
| 3,369,199 | 2/1968 | Sittig | 333—30 |
| 3,401,360 | 10/1968 | Schulz-Dubois | 333—30 |
| 3,387,233 | 4/1968 | Parker | 333—30 |
| 3,070,761 | 12/1962 | Rankin | 333—30 |

OTHER REFERENCES

G. A. Coquin et al.: "Perpendicular Diffraction Delay Lines," Proc. I.E.E., June 1965, pp. 581–591.

HERMAN K. SAALBACH, Primary Examiner

C. BARAFF, Assistant Examiner

U.S. Cl. X.R.

310—8, 9.5